US007016770B2

(12) United States Patent
Pfaffeneder

(10) Patent No.: US 7,016,770 B2
(45) Date of Patent: Mar. 21, 2006

(54) OUTPUT UNIT, RECEIVER UNIT, DATA TRANSMISSION FOR A MOTOR VEHICLE AND CORRESPONDING METHOD

(75) Inventor: Bernd Pfaffeneder, Lappersdorf-Kareth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/533,818

(22) PCT Filed: Sep. 23, 2003

(86) PCT No.: PCT/EP03/10577

§ 371 (c)(1),
(2), (4) Date: May 2, 2005

(87) PCT Pub. No.: WO2004/040852

PCT Pub. Date: May 13, 2004

(65) Prior Publication Data

US 2005/0273210 A1  Dec. 8, 2005

(30) Foreign Application Priority Data

Oct. 31, 2002 (DE) ............................... 102 50 920

(51) Int. Cl.
*G06F 7/00* (2006.01)
(52) U.S. Cl. .............................. 701/1; 701/36; 340/534
(58) Field of Classification Search ................ 701/1, 701/36, 29, 33, 49, 53; 340/853.2, 534, 538.15; 307/9.1, 10.1, 10.5, 10.6, 10.7; 375/259
See application file for complete search history.

(56) References Cited

U.S. PATENT DOCUMENTS

| 4,897,854 | A | 1/1990 | Harris et al. |
| 5,295,132 | A | 3/1994 | Hashimoto et al. |
| 5,633,631 | A | 5/1997 | Teckman |
| 6,205,383 | B1 | 3/2001 | Hermann |
| 6,693,372 | B1 | 2/2004 | Swart et al. |
| 6,823,020 | B1 | 11/2004 | Fendt et al. |
| 6,850,824 | B1 * | 2/2005 | Breed .......................... 701/36 |
| 6,865,458 | B1 * | 3/2005 | Kim ............................ 701/36 |
| 6,879,895 | B1 * | 4/2005 | Capps et al. .................. 701/36 |
| 6,906,618 | B1 * | 6/2005 | Hair et al. ............. 340/538.15 |

FOREIGN PATENT DOCUMENTS

| DE | 198 13 952 C 1 | 11/1999 |
| DE | 101 32 048 A1 | 1/2003 |
| EP | 0 384 258 A2 | 8/1990 |
| EP | 1 050 999 A1 | 11/2000 |
| WO | WO 98/52792 | 11/1998 |
| WO | WO 99/50996 | 10/1999 |
| WO | WO 03/005659 A2 | 1/2003 |

* cited by examiner

Primary Examiner—Richard M. Camby
(74) Attorney, Agent, or Firm—Laurence A. Greenberg; Werner H. Stemer; Ralph E. Locher

(57) ABSTRACT

The invention relates to the use of a first coding or decoding rule for a normal operation and of a second coding or decoding rule for a particular operation. Said invention provides the opportunity for speedily transmitting data between different satellite devices arranged in a motor vehicle and an evaluation unit arranged, for example in the central part thereof, even when the data bus (31, 32) of a transmission channel CAN (3) is externally short circuited, for example by a traffic accident, i.e. the data bus BUS L (32) and the data bus BUS H (31) are connected to earth (GND) or to a battery (Vbat). The invention can be used, in particular for protecting passengers.

29 Claims, 10 Drawing Sheets

FIG 2
| Bus | LOW | ZERO | HIGH | BLOCKED |
|-----|-----|------|------|---------|
| TxA | 1 | 1 | 0 | 0 |
| TxB | 0 | 1 | 1 | 0 |
| RxA | 1 | 1 | 0 | - |
| RxB | 0 | 1 | 1 | - |
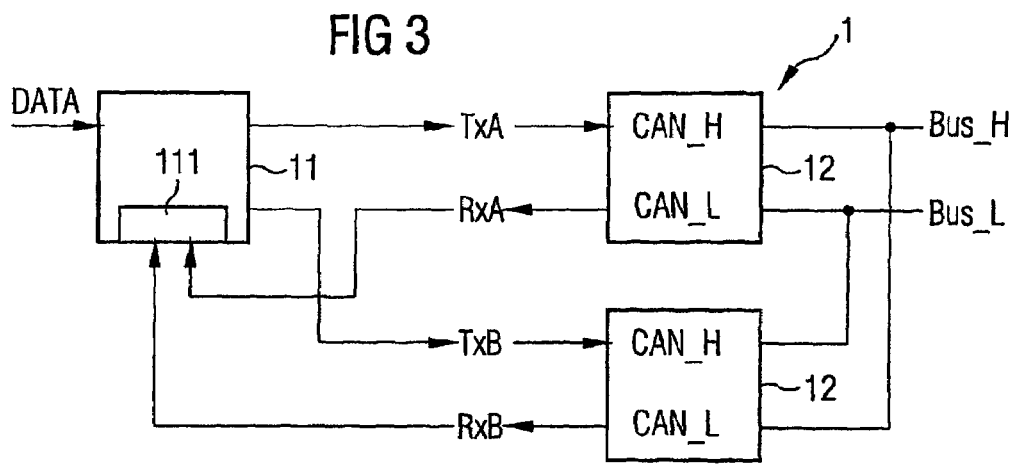
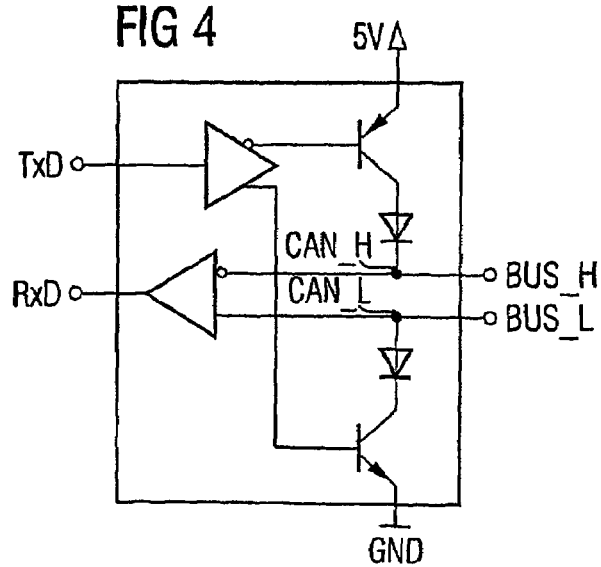

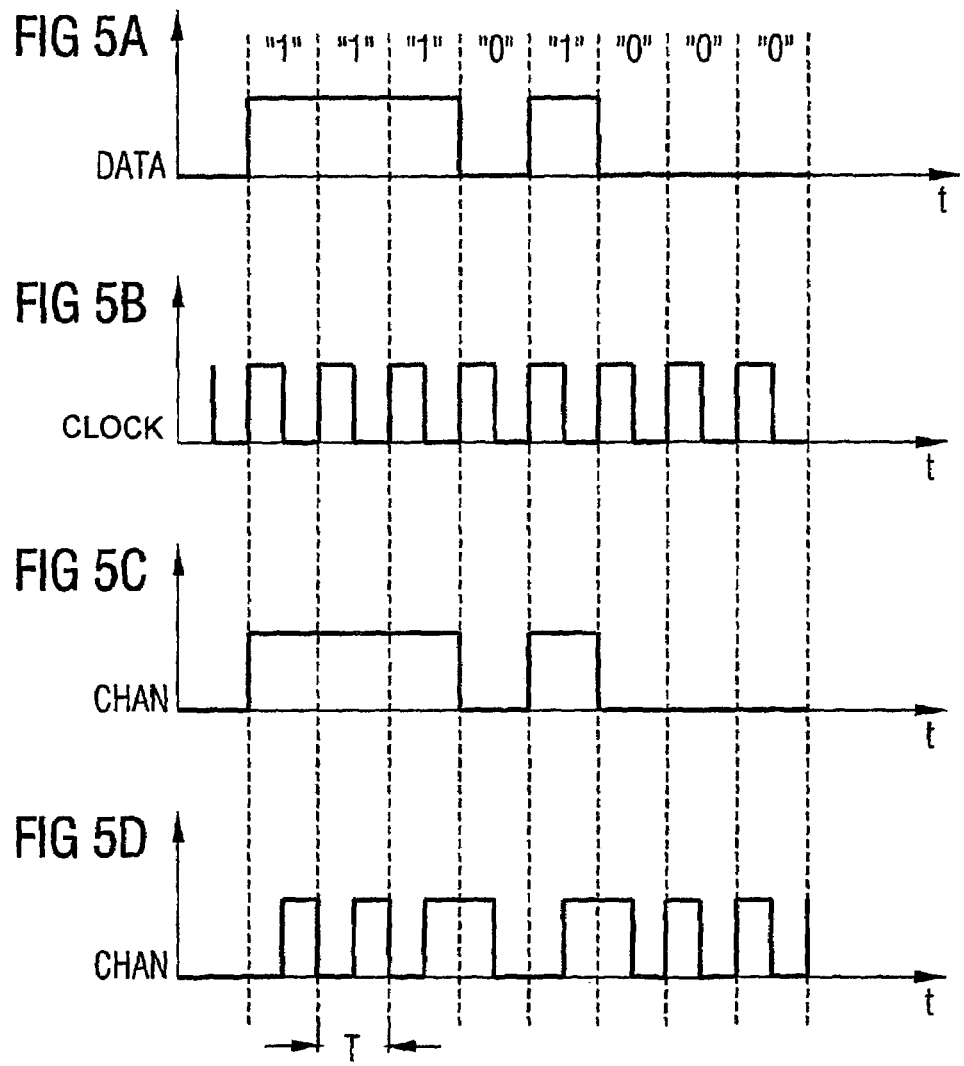

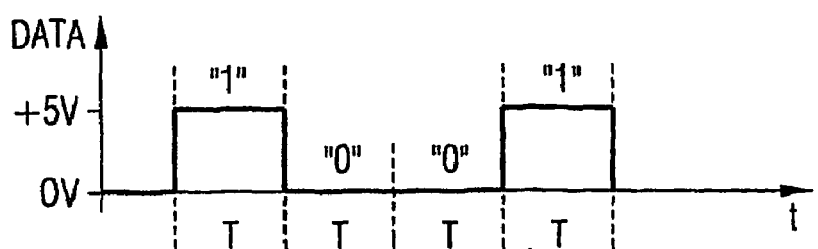
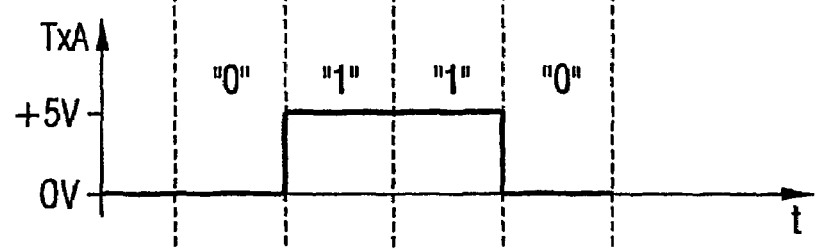
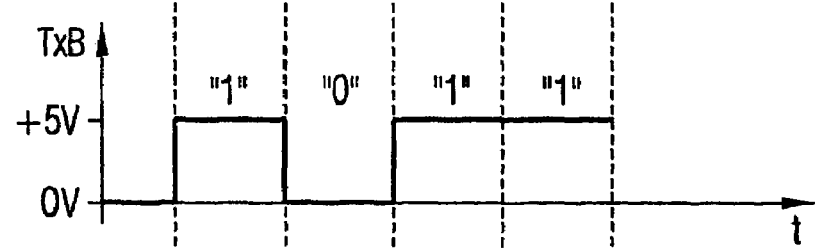
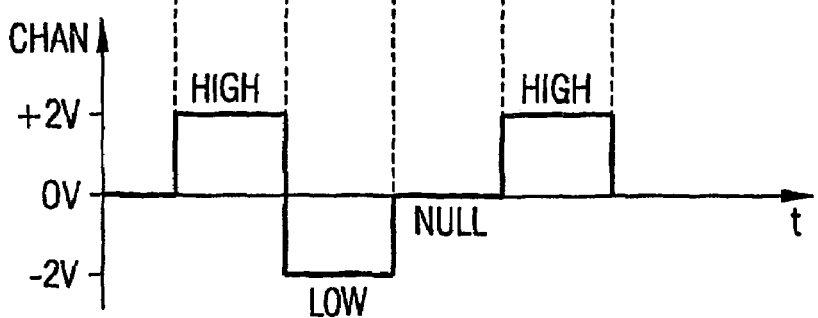

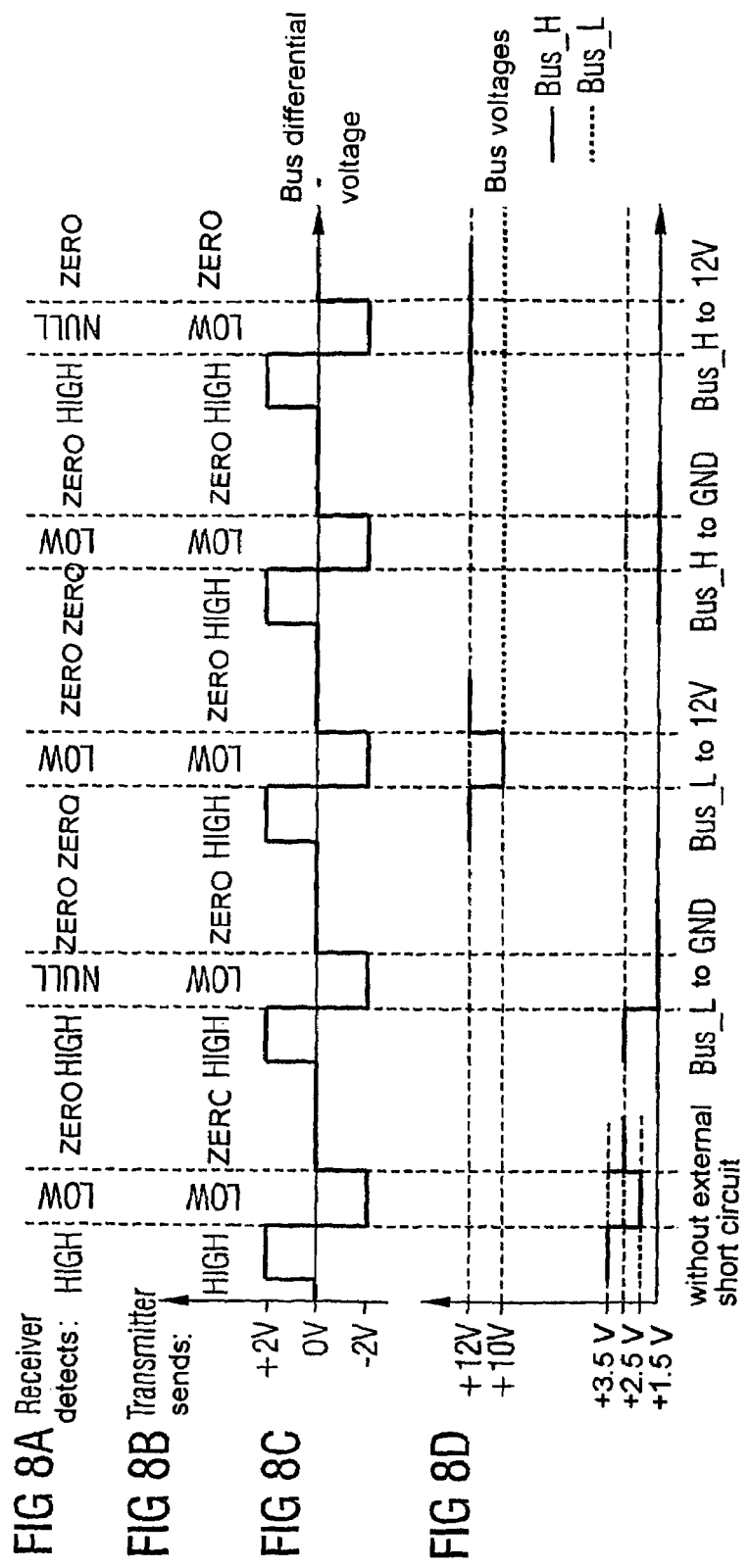

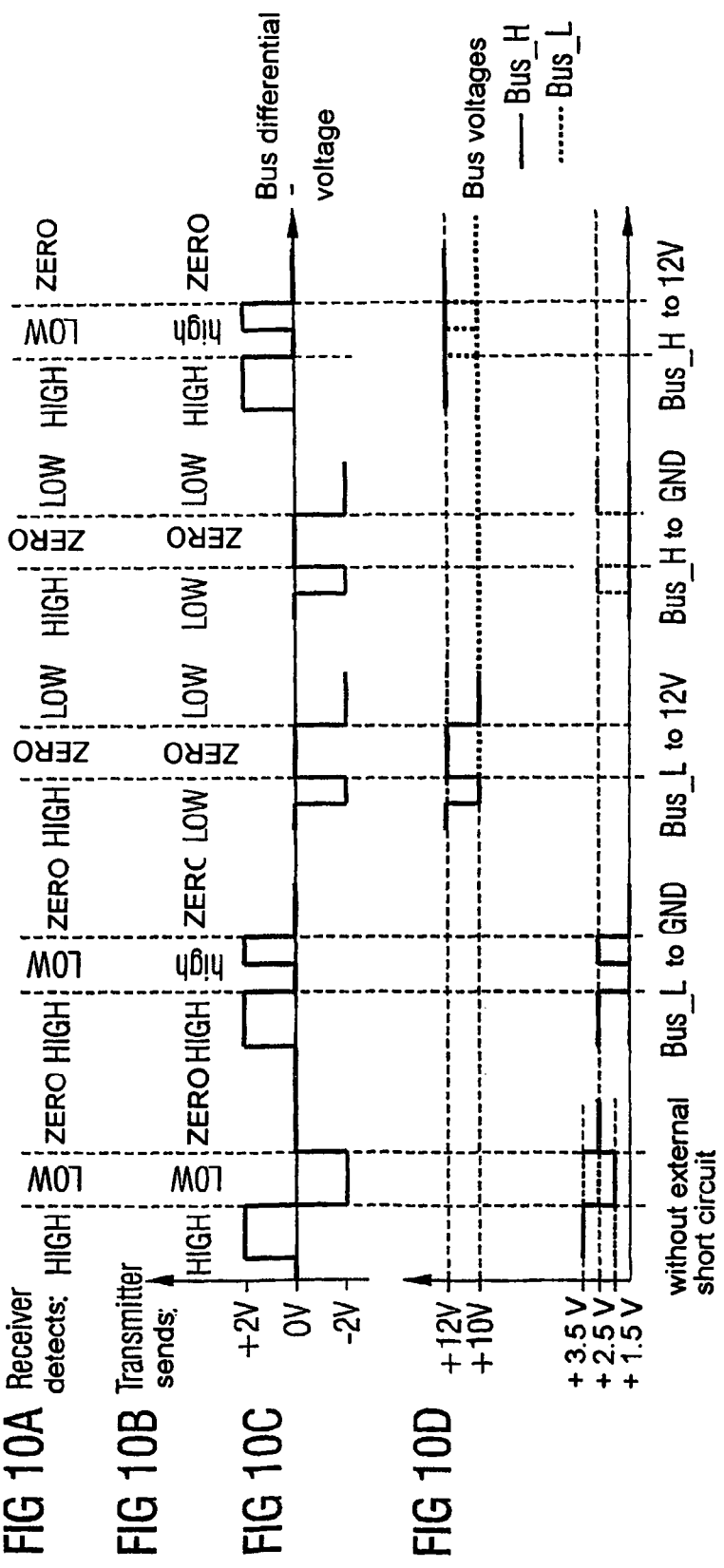

FA and FB = 0 (RxA and RxB = TxB)

| | | Tx=1 | Tx=1 | Tx=0 | Tx=0 |
|---|---|---|---|---|---|
| Q1 old | Q2 old | Q1 | Q2 | Q1 | Q2 |
| 0 | 1 | 1 | 1 | 1 | 0 |
| 1 | 1 | 0 | 1 | 1 | 0 |
| 1 | 0 | 0 | 1 | 1 | 1 |

FA and FB = 1 (RxA≠TxA or RxB≠TxB)

| | | Tx=1 | Tx=1 | Tx=0 | Tx=0 |
|---|---|---|---|---|---|
| Q1 old | Q2 old | Q1 | Q2 | Q1 | Q2 |
| 0 | 1 | 0 | 1 | 1 | 1 |
| 1 | 1 | x | x | x | x |
| 1 | 0 | 1 | 1 | 1 | 0 |

FIG 15

| RxA | 11 | 11 | 10 | 01 | 11 | 00 |
|---|---|---|---|---|---|---|
| RxB | 11 | 11 | 01 | 10 | 00 | 11 |
| Rx_old | 0 | 1 | - | - | - | - |
| Rx | 0 | 1 | 0 | 1 | 0 | 1 |

US 7,016,770 B2

1

OUTPUT UNIT, RECEIVER UNIT, DATA TRANSMISSION FOR A MOTOR VEHICLE AND CORRESPONDING METHOD

BACKGROUND OF THE INVENTION

Field of the Invention

The invention relates to a unit for outputting a signal on a transmission channel in a motor vehicle, a unit for receiving a signal from a transmission channel in a motor vehicle, an arrangement for data transmission in a motor vehicle via a transmission channel and a method for transmitting and receiving data in a vehicle.

Motor vehicles often have distributed control or computing units. Distributed control or computing units of this sort are generally understood to include units that are arranged in different locations in the motor vehicle. Because of their need to exchange data, these control and computing units are interconnected via a non-contact or wire-bound transmission channel whereby sensors arranged in the engine compartment, in the doors or in the tires, for example, transmit data to central computing units that algorithmically evaluate the received data and control actuators accordingly.

The wire-bound networking of control or computing units with sensor units is usually implemented by means of a bus system. An example of such a bus system is the well-known CAN-bus (CAN=Controller Area Network). Special transmitter and receiver devices or driver modules, in particular transceivers, are provided as means of accessing the bus transmission channel. Different speeds are used depending on the application: a high-speed CAN with data rates of 500 kbps for the drive train in the vehicle, for example, and the low-speed CAN with data rates of below 125 kbps, for example 83 kbps, for the car body area.

If the vehicle is involved in a traffic accident the CAN transmission channel may be damaged and short-circuited. This is also referred to as external short-circuiting of the bus lines (Bus_L; Bus_H) of the transmission channel. Four different scenarios are possible: Bus_L to chassis or earth (GND); Bus_L to battery (Vbat or BAT) with a voltage of 12V currently, and 42V soon; Bus_H to GND and Bus_H to BAT. Unlike in the low-speed area, in the high-speed area there are currently no fault-tolerant driver modules available, or—at best—only two of the above scenarios of external short-circuiting on one of the bus lines in the transmission channel are tolerated; these are either Bus_H to BAT or short-circuiting of the Bus_L line to GND. The drawback of this is that the transmission of sensor signals is not guaranteed at the very times when it could be vital, in particular if it involves sensor signals of a passive security system such as an airbag system, seatbelt tensioning system or similar.

Data transmission between the aforementioned units usually takes place asynchronously. To ensure that the data is correctly reconstructed in the receiver, therefore, said receiver must know the clock pulse data of the transmitting unit. This clock pulse data must therefore be transmitted from the transmitter to the receiver via the transmission route. If clock pulse data is transmitted in addition to other information, the transmission bandwidth is increased. The data transmission has an overhead.

The data generated in a unit—for example a sensor—is coded in this unit for transmission to a remote location. This is also referred to by experts as channel coding, which converts the data generated into a form suitable for transmission. This is effected on the basis of a coding rule which converts the sensor signal into the signal to be transmitted.

2

The term sensor signal is used throughout the following to mean the signal present in the transmitter, of which the information is to be transmitted to the receiver.

In motor vehicle technology such sensor signals are usually coded according to the NRZ Code or the Manchester Code and then transmitted. In this connection, FIG. 5 shows these known coding processes for data transmission in a motor vehicle.

FIG. 5a shows a sensor signal DATA over the time t, the information of which is to be transmitted to a receiver via a transmission channel. This sensor signal DATA is binary-coded and therefore has a character set of two characters: a "0" and a "1". Individual signal units of the sensor signal DATA have a duration T. Several such signal units arranged in sequence and each occupied by a character from the character set, together produce a data word which is physically present as a signal, characterized by its voltage or power states. FIG. 5b shows an power cycle TAKT of the transmitting output unit over the time t.

FIGS. 5c and 5d show signals to be transmitted CHAN, which pertain to the sensor signal DATA and are channel coded according to defined coding rules, whereby FIG. 5c shows a signal to be transmitted CHAN which has been recovered from the sensor signal DATA following NRZ coding. This coding is initially a 1:1 mapping of the sensor signal. In the UART (Universal Asynchronous Receive Transmit) standard the receiver is synchronized only by a start signal. The free-running oscillator provided in the receiver for clock generation must not abandon a predefined tolerance range until further synchronization with the transmitter is effected by a further start signal. This requires either a highly accurate oscillator in the receiver unit, or very frequent synchronization, which can place a burden on transmission bandwidths.

FIG. 5d shows a channel-coded signal to be transmitted CHAN, which has been recovered from the sensor signal DATA by Manchester coding. A feature of Manchester coding is that, like NRZ coding, it uses a binary character set. In the Manchester-coded signal, however, two characters/signal states are provided within a signal time unit T of the sensor signal. The change from one character in the sensor signal to its complementary character in the subsequent signal state is implemented in the Manchester code by a phase change. The Manchester Code therefore does offer the possibility of clock recovery in the receiver within a theoretical tolerance range of 50%. However, this timing recovery is at the expense of a doubling in the bandwidth, since one signal unit (bit) of the sensor signal is represented by two signal states during the same period of time T in the signal to be transmitted.

WO 98/52 792—A discloses a channel coding based on current modulation. In this method the channel coding has a character set of three characters, HIGH, LOW and zero. The sensor signal provides a binary code. According to the coding rule, the "ones" in the sensor signal are coded alternately into HIGH and LOW pulses in the signal to be transmitted. ZEROs in the sensor signal remain at ZERO level in the signal to be transmitted.

In this known data transmission method the temporal average of the signals to be transmitted is kept constant. However, a power cycle cannot be recovered from the signal to be transmitted.

EP 0 384 258 A2 discloses a data transmission method in which a binary sensor signal is channel-coded by means of an AMI (Alternate Mark Inversion) code combined with a pulse width modulation. In this method, the sensor signal undergoes pulse width modulation first and the pulse width-modulated signal thus formed is then subjected to Alternate Mark Inversion.

The drawback of this data transmission method is the increased bandwidth in the signal to be transmitted compared to the sensor signal. Moreover, the narrow pulses generated by pulse width modulation create problems in terms of electromagnetic compatibility (EMC) auf.

To alleviate these problems, DE 101 32 048 proposes designing a channel coding of the type whereby the code for the signal to be transmitted via the channel contains at least one more character in its character set than the character set from which the sensor signal is formed, of which the information is ultimately to be transmitted. Thus, for example, a binary code may be provided for the sensor signal, and then the signal to be transmitted is formed at least from a ternary code, i.e. three different characters—which are, for example, reflected by three different signal states on the line—are available for forming a signal. In general, n characters are available for the sensor signal, with n being a whole number, and at least n+1 characters are available for the signal to be transmitted.

SUMMARY OF THE INVENTION

The object of the invention is to specify an arrangement for transmitting data in a motor vehicle, a corresponding output unit and a corresponding receiver unit, and a method of transmitting and receiving data, in which—by using a high-speed CAN—the external short circuit protection of both bus lines (Bus_L and Bus_H) to both GND and BAT is guaranteed. In addition, the transmission bandwidth is to be kept to a minimum, whilst nevertheless enabling sufficient information about the power cycle to be transmitted to the receiver unit.

The part of the object relating to the output unit is achieved by the features of claim 1.

The part of the object relating to the receiver unit is achieved by the features of claim 10.

The part of the object relating to the data transmission system is achieved by the features of claim 18.

The part of the object of the invention relating to the method is achieved by the features of claim 19 or 20.

Advantageous embodiments and developments which can be used individually or in combination with one another are described in the relevant dependent claims.

The output unit, according to the invention, for emitting a signal CHAN to a transmission channel and which operates according to various case-dependent coding rules that are described in greater detail below, said output unit being formed from at least two bus lines, in a motor vehicle, comprises: a fault-tolerant coding unit for converting a sensor signal DATA into outgoing transmission signals TxA or TxB; at least two high-speed driver modules, which are connected antiparallel to one another and downstream from the coding unit, for connecting the output unit to the transmission channel and for converting the transmission signals TxA or TxB into the signal to be emitted CHAN; and a comparison unit, which permits a voltage comparison of the outgoing transmission signals TxA and TxB with incoming receive signals RxA and RxB.

The receiving unit, according to the invention, for receiving a signal CHAN from a transmission channel and which operates according to various case-dependent decoding rules that are described in greater detail below, said recovery unit being formed from at least two bus lines, in a motor vehicle, comprises: a decoding unit for converting incoming receive signals RxA or RxB into a working signal DATA; at least two high-speed driver modules, which are connected antiparallel to one another and upstream from the decoding unit, for connecting the receiver unit to the transmission channel and for converting the signal to be received CHAN, into incoming receive signals RxA and RxB, and a detection unit, which permits the detection of timing pulse edges from the incoming receive signals RxA and RxB.

According to the invention, the arrangement for transmitting data in a motor vehicle via a transmission channel, comprising at least two bus lines, uses an output unit according to one of claims 1 to 9 and a receiver unit according to one of claims 10 to 17.

A particular feature of the method, according to the invention, for transmitting and receiving data in a motor vehicle, is that it uses a first coding or decoding rule for a normal operating mode and a second coding or decoding rule for a special operating mode.

This channel coding is carried out, according to the invention, by means of a first coding rule for the normal operating mode in which the equivalence between the voltages of TxA and RxA and/or of TxB and RxB is detected by the comparison unit. A second coding rule is provided, according to the invention, if an inequivalence is correspondingly detected in the said voltages, i.e. if one of the bus lines BUS_L or BUS_H is externally short-circuited to earth (GND) or battery (Vbat).

The channel decoding is carried out, according to the invention, by means of a first decoding rule for the normal operation of the decoding unit if synchronism of timing pulse edges is detected by the detection unit for a defined signal time unit T. A second decoding rule is provided, according to the invention, if asynchronism is correspondingly detected in the said timing pulse edges for the defined duration of the signal time unit T.

In both cases the channel coding is carried out, according to the invention, in such a way that the code for the decoded operating signal DATA provides a character set of only n characters, if the character set for the signal to be received CHAN or the incoming receive signals RxA and RxB have at least n+1 characters.

Channel coding is likewise carried out in both cases in such a way that the code for the outgoing transmission signals TxA and TxB, or for the signal to be transmitted CHAN via the channel, contains at least one more character in its character set than the character set from which the sensor signal DATA is formed, of which the information is ultimately to be transmitted. Therefore, if a binary code is provided for the sensor signal, then the signal to be transmitted is formed at least from a ternary code, i.e. at least three different characters—which are, for example, reflected by three different signal states on the line—are available for forming a signal. Generally speaking, n characters are available for the sensor signal, with n being a whole number, and at least n+1 characters are available for the signal to be transmitted.

It should further be noted that, preferably, a signal time unit of the sensor signal is mapped to a signal unit of the signal to be transmitted, preferably on a one-to-one basis or as a divisible time unit corresponding to it. In this way the signal time units of the sensor signal and the signal to be transmitted are of the same duration or have equal numbers of time segments. Furthermore, the invention makes provision in a further embodiment whereby two consecutive signal time units in the signal to be transmitted always have different characters taken from the allocated character set. This feature is implemented in that the character set of the channel code comprises at least one character more than the character set allocated to the sensor signal. This means that a character change and therefore a state change can always take place in the signal to be transmitted, even if the sensor signal has the same character over several signal time units and therefore has the same state. The same applies to the decoding.

Continuous changing of states, for example in the signal to be transmitted, in turn helps to ensure that the power cycle of the remote output unit can be easily and advantageously recovered in the receiver unit. This is preferably effected by means of a timing recovery unit. Since the duration of the signal units of the sensor signal in the output unit and of the signal received from the receiver unit correspond and at least one state change is effected after each signal time unit, only the state change in the received signal needs to be captured by the receiver unit to be able to recover the power cycle from the output unit. However, the bandwidth is not increased at the same time—as, for example, in the case of Manchester coding described above—since the time units for the individual bits (signal time units) are always of equal duration or can be recovered accordingly in the corresponding case described.

The advantage of the invention is that, on the basis of changing operating modes in the output unit and in the receiver unit, a communication system can be provided that can tolerate all types of external short circuits specified above using high-speed driver modules, and therefore guarantees protection against external short circuits. This is something that has hitherto not been provided in the prior art. The invention also has the advantage that only approximate oscillators—or no oscillators at all—need to be used in the receiver unit. This makes for a cost effective overall system. The approximate oscillators can be integrated in a chip. Furthermore, standard bus high-speed drivers can be used.

The invention can always be used in the motor vehicle as soon as data is to be transmitted between two computing or control units. The invention is particularly useful wherever sensor data from sensors distributed over the vehicle is connected with a high degree of reliability to control units arranged in the central part of the vehicle and these control units are to be supplied with sensor data. The invention is particularly suitable for use in passenger protection, as a means of facilitating the high-speed transmission of sensor data from impact sensors located at the front or sides of the vehicle, for example, to an evaluation unit located in the central part of the vehicle. These impact sensors may be acceleration sensors with signal processing connected downstream and corresponding interface, or even pressure sensors.

Exemplary embodiments of the invention and advantageous developments are described in greater detail below with the help of drawings, in which;

BRIEF DESCRIPTION OF THE DRAWINGS

FIG. 2 shows a table showing driver activation of an output unit according to the invention and a receiver unit according to the invention;

FIG. 3 shows an enlarged section of the output unit according to the invention as shown in FIG. 1;

FIG. 4 shows the logic circuit of a high-speed driver module, for example the output unit shown in detail in FIG. 3;

FIG. 5 shows signal patterns according to known coding processes;

FIG. 6 shows the signal pattern of the coding process according to the invention for the normal operating mode;

FIG. 8 shows how, in a ternary signal, the short-circuiting of a bus line to GND or Vbat is effected only in coding according to the first coding rule;

FIG. 10 shows how, in a ternary or higher-value signal, the short-circuiting of a bus line to GND or Vbat is effected only in coding according to the second coding rule;

FIG. 15 is a table according to which the sampled signals RxA and RxB are allocated by a logic, for example to the output value.

The same references are used for the same elements or signals across all the diagrams.

DESCRIPTION OF THE PREFERRED EMBODIMENTS

Figure 1:
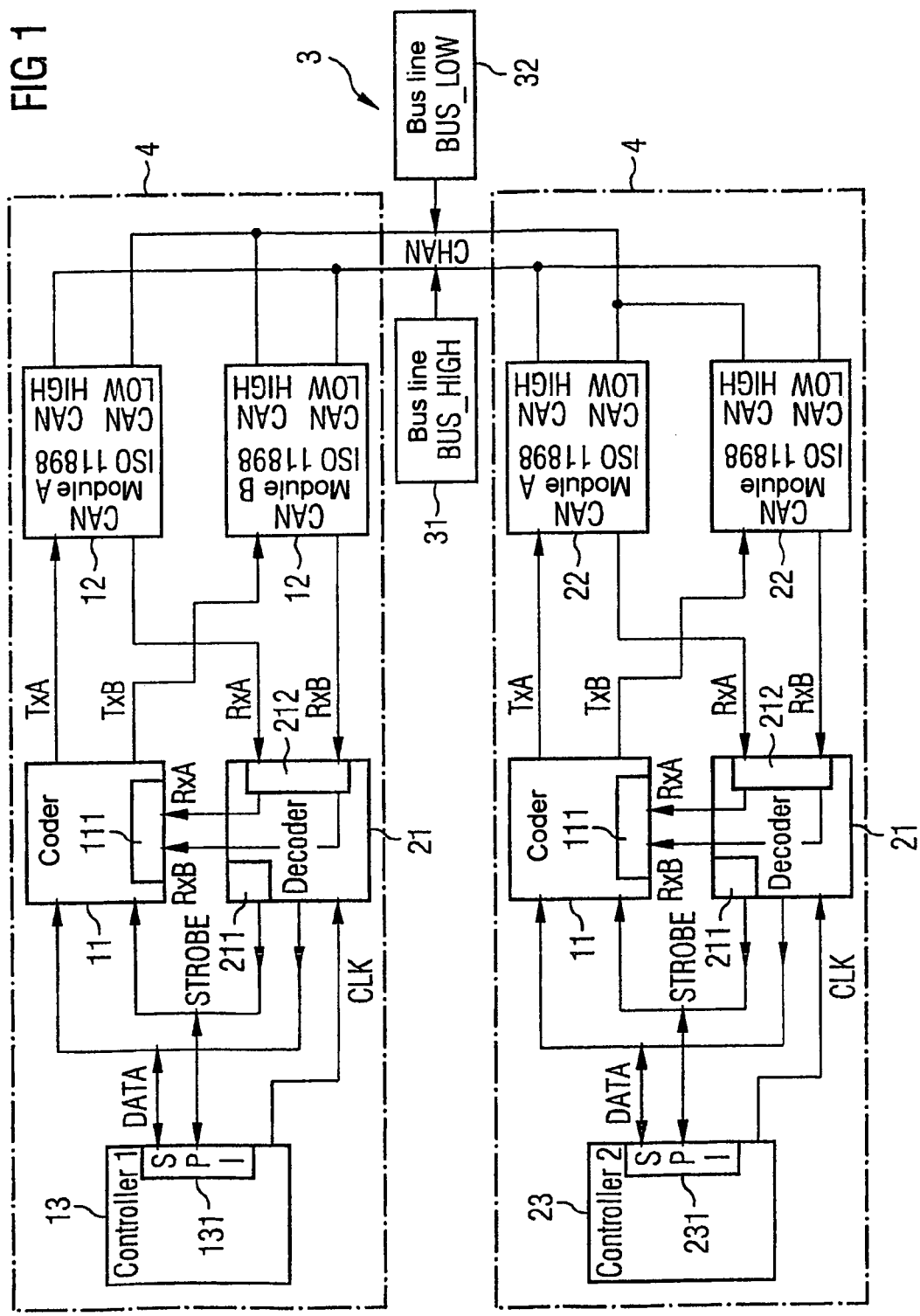
FIG. 1 shows a block diagram of an arrangement with two combined output and input units according to the invention.

FIG. 1 is a block diagram of an arrangement 4 with two combined output and input units 4 according to the invention, which are connected via a transmission medium 3, which in turn has two bus lines 31 and 32. The first output and receiver unit 4 contains a microcontroller 13 with an interface 131, an encoder 11, a decoder 21 and two high-speed driver modules 12. The high-speed drivers 12 are CAN drivers in the form of standard modules, which—according to DIN ISO 11898—can use standardized cables and plugs. The high-speed drivers 12 are connected antiparallel to one another and to the transmission medium 3, with the CAN-HIGH output of the first high-speed driver 12 (Module A) and the CAN-LOW output of the other high-speed driver 12 (Module B) being connected to the first bus line 31. Likewise, the CAN-LOW output of the first high-speed driver 12 (Module A) and the CAN-HIGH output of the second high-speed driver 12 (Module B) are connected to the second bus line 32. As a result of this interconnection of the high-speed driver modules 12, three bus states (HIGH, LOW and ZERO) can be generated between the bus lines 31 and 32.

FIG. 2 is a table showing driver activation of the output unit 1 and receiver unit 2 according to the invention, from which it may be seen how the inputs TxA and TxB of the driver 12 are to be occupied in order to obtain the bus states LOW, ZERO and HIGH. Thus to trigger a LOW bus state, for example, TxA must be occupied with a "1" and TxB with a "0" at the same time. Such interconnection of the high-speed drivers 12 is only permitted if it is not possible for the two drivers 12 to actively drive different potentials. According to the table in FIG. 2, a state must be prevented in which both the driver inputs TxA and TxB are unoccupied. For this purpose, Tx=5 volts is the recessive state and Tx=0 volts is the dominant state.

FIG. 3 shows an enlarged section of the output unit 1 according to the invention as shown in FIG. 1, comprising the coding unit 11 for converting a sensor signal DATA into outgoing transmission signals TxA and TxB. The data to be transmitted is delivered as a sensor signal DATA from the microcontroller 13 via its SPI interface 131 (SPI=Serial Peripheral Interface) to the coding unit 11. This SPI interface 131 enables data to be read in and output synchronously via a data and clock line. The two high-speed driver modules 12, which are connected antiparallel to one another and are used for connecting the output unit 1 to the transmission channel 3 and for converting the outgoing transmission signals TxA and TxB into a signal to be emitted CHAN, are connected downstream from the coding unit 11. For this purpose the input TxA is allocated to the first high-speed driver module 12, and the input TxB is allocated to the second high-speed driver module 12. The control of the driver modules 12 via the signals TxA and TxB is effected by the coding unit 11, which implements coding rules according to the invention. Thus the coding unit 11 operates according to a first coding rule for normal operation where equivalence is detected between the voltages of the outgoing transmission signal TxA and an incoming receive signal RxA. A comparison of TxB with RxB is likewise effected, for which purpose the output unit 1 has a comparison unit 111 which permits comparison of the voltage of the outgoing transmission signals TxA and TxB with incoming receive signals RxA and RxB. Instead of operating according to the first coding rule, the coding unit 11 operates according to a second coding rule in the event of inequivalence being detected by the comparison unit 111 between the voltages of TxA and RxA and/or TxB and RxB, and therefore—in particular—in the event of the external short-circuiting of at least one of the bus lines 31 or 32 to GND or BAT.

FIG. 4 shows the logic circuit of a high-speed driver module 12, for example the output unit 1 shown in detail in FIG. 3.

FIG. 5 schematically shows signal patterns pertaining to the coding processes already known and acknowledged at the start of this description.

FIG. 6 shows the signal pattern of the coding process according to the invention for the normal operating mode of a coding unit 11. In this signal pattern each character is represented by a discrete, electrical signal state. Thus FIG. 6a shows an exemplary binary sensor signal DATA over the time t with—for example—four signal time units (bits), each having a time duration T. The binary character set contains only a "1" and a "0" character. The "1" character is signified in the output unit 1 by a 5-volt voltage state, whilst the "0" character is signified by a 0-volt voltage state. The exemplary sensor signal DATA contains the following character sequence: "1", "0", "0", "1".

The outgoing transmission signals TxA and TxB pertaining to the sensor signal DATA according to FIG. 6a can be seen in FIGS. 6b and 6c respectively and correspond to the tabular values for driver activation as set out in FIG. 2. The "1" character preferably corresponds to a voltage pulse of +5 volts, whilst the "0" character preferably corresponds to a voltage state of 0 volts.

The signal to be transmitted CHAN, which pertains to the outgoing transmission signals TxA and TxB and has been converted by the driver modules 12, is shown with regard to its logical pattern in FIG. 6d. A character set with three characters—HIGH, LOW, ZERO—is always provided for the signal to be transmitted CHAN. Each signal time unit T of the signals DATA, TxA and/or TxB corresponds to a signal time unit T of the signal to be transmitted CHAN. The bit times are therefore equal in all signals, so that—advantageously—there is no increase or reduction in bandwidth. The HIGH character preferably corresponds to a voltage pulse of +2 volts, the LOW character preferably corresponds to a voltage pulse of −2 volts, and the ZERO character preferably corresponds to a voltage state of 0 volts.

The first coding rule for normal operation provides the following rules:

a "1" character in the sensor signal DATA is always coded into a HIGH character in the outgoing transmission signal TxA or TxB. A "0" character in the sensor signal DATA is always coded into a LOW character in the outgoing transmission signal TxA or TxB. However, if a "0" character in the input signal DATA is followed by a further "0" character, this further "0" character is not coded into a further LOW character in the transmission signal TxA or TxB, but into a ZERO character. The same applies for two consecutive "1" characters in the sensor signal DATA. Here, too, a "1" character immediately following another "1" character is coded as a ZERO character in the outgoing transmission signal TxA or TxB.

However, if the preceding character in the outgoing transmission signal TxA or TxB is a ZERO character, then coding is effected according to the coding rules explained above, so that a further "0" character in the sensor signal DATA is coded with a LOW character in the outgoing transmission signal TxA or TxB, or a subsequent "1" character in the sensor signal DATA is coded into a HIGH character in the outgoing transmission signal TxA or TxB.

Other coding variants are of course also included in the protective system, whereby—for example—a "0" character in the sensor signal can be converted into a HIGH character in the outgoing transmission signal TxA or TxB.

With this type of coding, a state change can always be generated on the transmission medium 3 between two signal time units. An edge is therefore always created between two bits. In any coding included in the protective system, therefore, it is necessary to ensure that a state change takes place after each signal time unit.

The conversion of the outgoing transmission signals TxA and TxB into a signal to be emitted CHAN is effected by the high-speed driver modules 12, which are connected antiparallel to one another.

Figure 7:
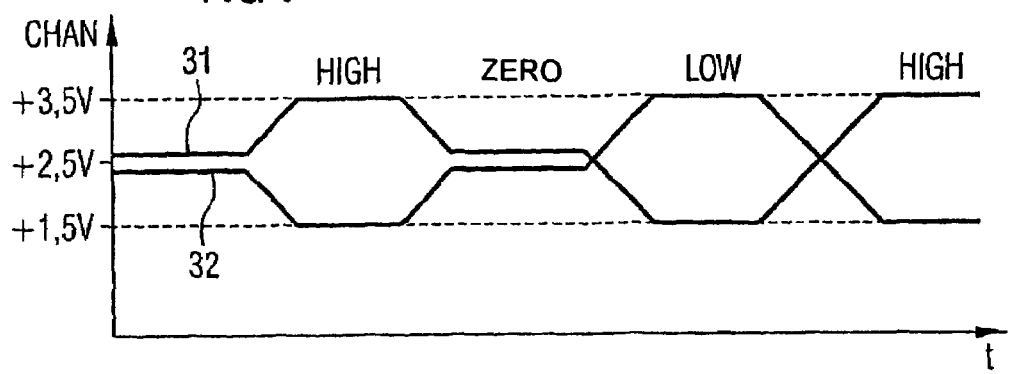
FIG. 7 shows the physical pattern of a signal to be transmitted CHAN to a bus, which is illustrated logically in FIG. 6d.

FIG. 7 shows the signal to be transmitted CHAN to a bus 3, the logical pattern of which is illustrated in FIG. 6d, in terms of its physical pattern, i.e. characterized according to the patterns of the signal potentials on the individual bus lines 31 and 32, and therefore relating to a two-wire transmission medium. The differential voltage between these two bus lines 31 and 32 delivers the signal level for the CHAN signal to be transmitted.

FIG. 8 shows how, in a ternary signal, the short-circuiting of a bus line to GND or Vbat is effected only in coding according to the first coding rule. The respective bus voltages are shown in FIG. 8d. Thus the short-circuiting of BUS_L to GND or of BUS_H to Vbat is tolerated, yet the driver structure does not permit the short-circuiting of BUS_H to GND or of BUS_L to Vbat. In these two cases sufficient bus differential voltage is not generated, bringing communication to a halt—as shown by FIG. 8—and potentially with fatal consequences. In particular, FIG. 8b shows the characters sent by the transmitter and FIG. 8a shows the characters detected by the receiver.

Figure 9A:
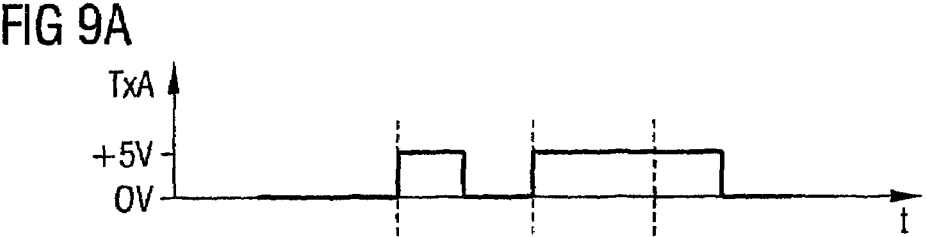
FIG. 9 shows the signal pattern of the coding process according to the invention for the special operating mode.
Figure 9B:
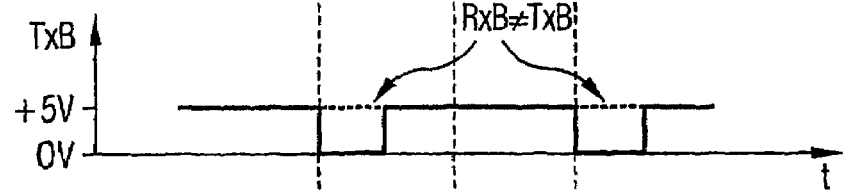
Figure 9C:
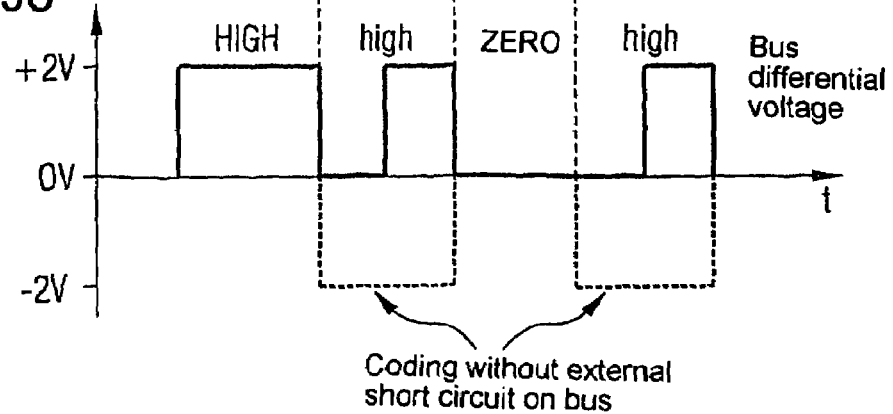

FIG. 9 shows the signal pattern of the coding process according to the invention, for the special operating mode, of a coding unit 11. FIG. 9a and FIG. 9b show the respective signal patterns of TxA and TxB in the event of an inequivalence being detected in the voltages of TxA and RxA and/or TxB and RxB. This state can be detected by the comparison unit 111. The comparison unit 111 therefore detects that a dominant signal cannot be represented on the bus 3 and initiates the conversion of the outgoing signals TxA and TxB by consulting a time condition. The resulting signal pattern is shown in FIG. 9c. For comparison purposes the dotted line shows the coding in the normal operating mode, i.e. without an external short circuit on the bus 3. A HIGH character in the outgoing transmission signal should be followed by a LOW character. Because of damage to the transmission channel 3—due to an accident, for example—the Bus_L line 32 has been short-circuited to earth (GND). The LOW character about to be transmitted can no longer be transmitted as a result. This is detected by the comparison unit 111, which preferably initiates a conversion after half of a signal time unit T has elapsed, whereby it changes the voltage of the LOW character about to be transmitted. Instead of a voltage pulse of −2 volts, a voltage pulse of +2 volts is now generated, which begins—in this example—with a half signal time unit, and ends with a full signal time unit. A "high character" of this type thus indicates a time condition which enables it to be differentiated from the characters of the previous character set (LOW, HIGH, ZERO). Of course, high characters may also be generated with suitable time conditions other that those mentioned above by way of example. Depending on the application, it has been found beneficial for the character about to be transmitted (LOW, HIGH) to be switched to the other polarity at a point between 40% and 60% or even between 30% and 70% into the signal time unit T. It is also advantageous if the detection of the short circuit, irrespective of the point in time of the polarity switch, is allowed to take place not only after half of a signal time unit has elapsed, but is moved forward even earlier, for example after 40%, or, even more significantly, after just 30% or 20% of the signal time unit T has elapsed. Of course, safety routines are also possible which—for example—test predefinable tolerance ranges in the inequivalence detected between the voltages of TxA and TxB. Time condition rules formed in this way can therefore advantageously take into account the greatest diversity of basic conditions.

The second coding rule for the special operating mode provides the following rules:

In the event of the external short-circuiting of Bus_L 32 to GND, a LOW character about to be transmitted in the transmission signal TxA or TxB is converted into a high character with time condition; in the event of the external short-circuiting of Bus_L 32 to BAT, a HIGH character about to be transmitted in the transmission signal TxA or TxB is converted into a low character with time condition; in the event of the external short-circuiting of Bus_H 31 to GND, a HIGH character about to be transmitted in the transmission signal TxA or TxB is converted into a low character with time condition; in the event of the external short-circuiting of Bus_H 31 to BAT, a LOW character about to be transmitted in the transmission signal TxA or TxB is converted into a high character with time condition; whereby a recessive ZERO character is transmitted as a ZERO character in each of the aforementioned short-circuit cases.

As already mentioned in the channel coding described for the normal operating mode, the channel coding for the special operating mode advantageously also permits the recovery of power cycles in the receiver unit 2 on the basis of the regular state change in the signal to be transmitted CHAN, without the aid of an additional oscillator.

The signal-to-noise ratio is likewise not reduced by the coding processes if the ISO 11898 high-speed layer is used.

In any case, there are steeper edges in the transition from a HIGH character to a LOW character.

FIG. 10 shows how, in a ternary or higher-value signal, the short-circuiting of a bus line to GND or Vbat is effected only in coding according to the second coding rule. This approach advantageously enables all four fault cases to be tolerated. The recessive ZERO is transmitted in all cases. In the case of the other two, dominant characters, HIGH and LOW, the transmitter compare the signal sent with the signal received. These are different in the event of a fault.

The transmission logic recognizes this, and in this case switches to the special operating mode and encodes according to the second coding rule, in which only the recessive ZERO and one of the two dominant bus states low or high, even though additionally transformed by a time condition, are used. FIG. 10a shows what the receiver detects; what is previously sent by the transmitter is shown in FIG. 10b. The transformation by means of a time condition thus permits the receiver, advantageously, to interpret the characters in a way other than that would normally be proposed by the bus differential voltage, as illustrated in FIG. 10c. The respective bus voltages are shown in FIG. 10d.

To summarize, therefore, a binary signal ("0", "1") is coded or decoded into a ternary signal (LOW, HIGH, ZERO) or higher-value signal (LOW, HIGH, ZERO, low, high) whilst maintaining the bit times or corresponding partial time units, i.e. observing the state change in the signal to be transmitted. The channel coding processes according to the invention ultimately use at least three characters/states on one transmission bus 3 in order to show two data characters/states. Thus, in the value area, an overhead of $\log_2 3 = 1,58 = 36\%$ is achieved. In contrast, four states (2 bits) are required to show two data states in a Manchester code. An overhead of $\log_2 4 = 2 = 50\%$ is therefore achieved in the time area.

Figures 11, 13:
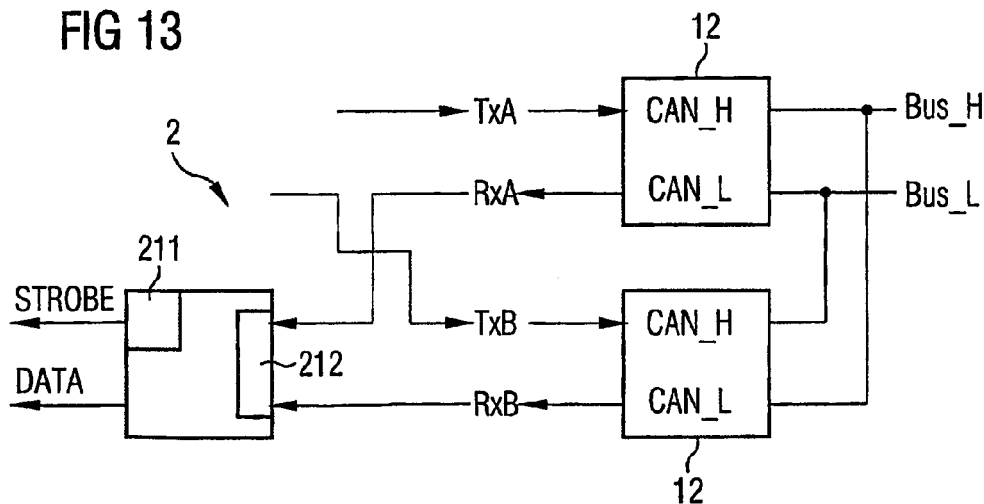
FIG. 11 shows a relevant state table for the output unit according to FIG. 12.
FIG. 13 is an enlarged section of the receiver unit according to the invention as shown in FIG. 1.

The previously described coding can be implemented, by means of software, in a microcontroller or even in hardware, for example in a so-called state machine, which follows the state table according to FIG. 11. In this table, Tx is the input signal of the coding unit 11 and thus corresponds to the sensor signal DATA. The signals TxA and TxB correspond in the table to the variables Q2 and Q1 respectively. The transmission signals TxA and TxB are continuously compared with the receive signals RxA and RxB. If a difference in voltage is detected here, a signal "Fault A" (FA) or "Fault B" (FB) is generated, for example at the inputs of a flip-flop.

The following output equations can be obtained from the state table according to FIG. 11.

$$TxA = (NOT)Tx + (NOT)Q1^*Q2^*(NOT)FA + Q1^*(NOT)Q2^*FA;$$

$$TxB = Tx + Q1^*(NOT)Q2^*(NOT)FB + (NOT)Q1^*Q2^*FB$$

Figure 12:
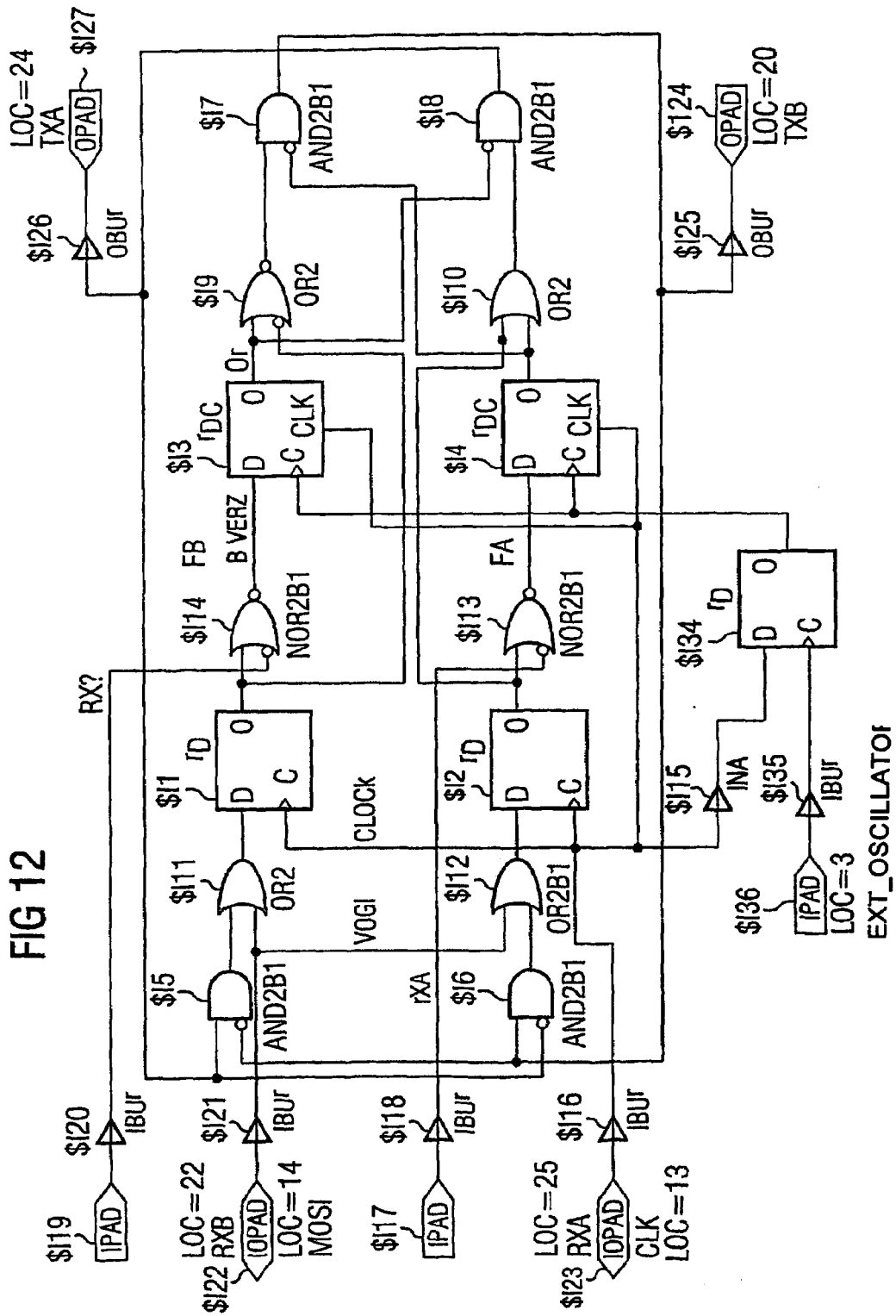
FIG. 12 shows components of an output unit.
Figure 14A:
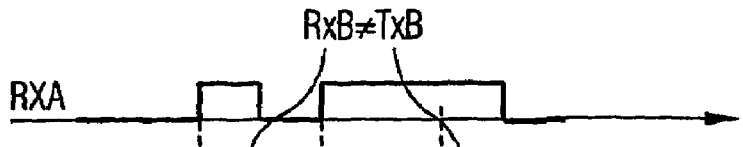
FIG. 14 shows the process for clock recovery.
Figure 14B:
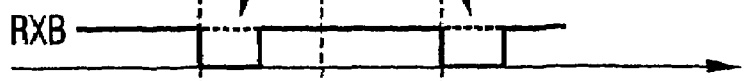
Figure 14C:
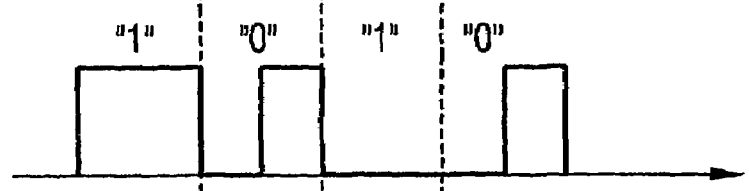
Figure 14D:
Figure 14E:
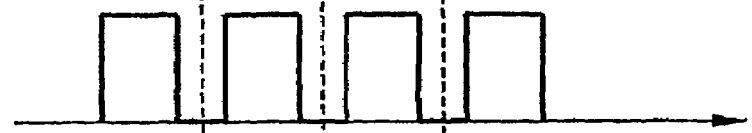
Figure 14F:
Figure 14G:
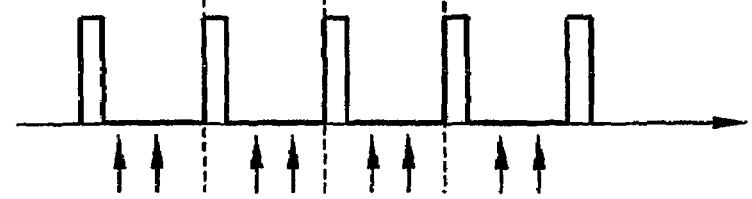

FIG. 12 shows an implementation of these equations in a logic circuit of an output unit 1. If TxA="0" and RxA="1", for example, it is recognized that the line Bus_H is connected to GND or the line Bus_L is connected to Vbat. The transceiver 12 (Module A) cannot transmit any signals. In this case the inverse state is set on the bus 3 by a D-flip-flop. Unlike known flip-flops, this flip-flop is not triggered by the rising edge, but preferably by the falling edge of a system clock signal (S-CLK) of the SPI interface 131. If the pulse duty factor is 50%, for example, this preferably occurs after half of the bit time has elapsed. Likewise if TxB="0" and RxB="1", the signal is preferably inverted at the latest after half of the bit time has elapsed.

FIG. 13 shows an enlarged section of the receiver unit 2 according to the invention as shown in FIG. 1, including the decoding unit 21 for converting incoming receive signals RxA and RxB into an operating signal DATA. Two high-speed driver modules 22, which are shown in greater detail in FIG. 4, are connected antiparallel to one another and upstream from the decoding unit 21, their purpose being to connect the receiver unit 2 to the transmission channel 3 and to convert the signal to be received CHAN, into incoming receive signals RxA and RxB. This transformation process is in turn based on the state table according to FIG. 2 with reference to the outputs RxA and RxB of the drivers 12. The drivers 12 thus operate as the CAN bus transceivers.

The signals RxA and RxB are routed to the coding unit 21. The received signals are decoded in the decoding unit 21 and sent as an operating signal DATA, via the interface 231, to the microcontroller 23 for further processing.

The first decoding rule for normal operation provides the following rules: a LOW character in the receive signal RxA or RxB is always decoded into a "0" character or a "1" character in the operating signal DATA; a HIGH character in the receive signal RxA or RxB is always decoded into a "1" character or a "0" character in the operating signal DATA; so that the character in the operating signal DATA, that is recovered from a ZERO character in the receive signal RxA or RxB, is identical to the preceding character "0" or "1" of the operating signal DATA.

The character about to be decoded, however, is interpreted under the condition of an external short circuit if the time between two occurring timing pulse edges is less than 0.6 to 0.9 of a signal time unit (T), and—in particular—is less than 0.75 of a signal time unit (T), or is greater than 1.1 times to 1.4 times a signal time unit (T), and—in particular—is greater than 1.25 times a signal time unit (T).

This second decoding rule provides the following rules for the special operating mode: in the event of a short-circuiting of Bus_L 32 to GND, a converted high character with time condition is decoded into a LOW character; in the event of the external short-circuiting of Bus_L 32 to BAT, a converted low character with time condition is decoded into a HIGH character; in the event of the external short-circuiting of Bus_H 31 to BAT, a converted high character with time condition is decoded into a LOW character, whereby a recessive ZERO character is decoded as a ZERO character in each of the aforementioned short-circuit cases.

Furthermore, a power cycle STROBE is recovered from the received signals RxA or RxB by means of a timing recovery unit 211. The said power cycle is in turn routed back to the coding unit 11.

The decoding unit 21 is then in effective connection with a detection unit 212, which permits the detection of timing pulse edges from the incoming receive signals RxA and RxB. Thus the decoding unit 11 operates according to the first decoding rule for normal operation if synchronism of the timing pulse edges is detected by the detection unit 212 at a defined signal time unit T. The decoding unit 21 operates according to the second decoding rule for the special operating mode, if asynchronism of the timing pulse edges is detected by the detection unit 212 for the signal time unit T. This asynchronism corresponds to the time conditions already described above.

The additional combined output and receiver unit 4 is constructed symmetrically and in turn contains a microcontroller 23 with interface 231, a coding unit 11, a decoding unit 21 and two high-speed drivers 22, all of the functions of which have already been described.

Data transmission is therefore effected according to the following procedure, for example: the microcontroller 13 emits a data sequence via the SPI interface 131. The coding unit 11 converts this data sequence into outgoing transmission signals TxA or TxB, which are sometimes also known as tri-state signals (TxA, TxB). From these, the CAN bus transceivers/drivers 12 then generate the corresponding bus states. The bus transceiver 12 of the further combined output and receiver unit 4 receives the signal CHAN and converts it accordingly into the signals RxA and RxB. The decoding unit 21 or the timing recovery unit 211 of the receiver 2 that operates in effective connection with it, generates from it the operating signal DATA, which should—incidentally—be identical to the input signal DATA, and the power cycle STROBE, which are routed via the SPI interface 231 to the microcontroller 23.

The decoding unit 21 is timed by the controller 23. The cycle time must be more than twice the data rate. The clock rate has no upper limit.

All components, but in particular the coding unit 11 and decoding unit 21, may be implemented as hardware or even as software in a microcontroller. Of course, the components that are in effective connection can also be integrated in a common ASIC. Because of the high-speed application, their implementation in the form of hardware proves to be particularly advantageous.

Depending on the number of bits to be transferred in sequence and the number of data items, it is possible that the coding unit 11 might not end with a ZERO character but with a LOW-character or a HIGH character. In the event of multiple access to the bus medium 3, however, the final bus state must be the idle state ZERO. There are several possible ways of ensuring this. Firstly, this final bus state may be achieved by a logical condition: if the last counted number of bits of the same kind is odd, a pseudobit of the same type is appended, enabling the coding unit to return to the ZERO state. This function can be carried out either in the microcontroller 13 and/or 23 or in the coding unit 11.

Alternatively, a further time condition may be introduced: the coding unit 11 sets the ZERO if a state change has not occurred after a certain time.

FIG. 14 shows the procedure for clock recovery from the two input signals RxA and RxB in a timing recovery unit 211 operating in effective connection with the decoding unit 21. This is effected in turn by edge detection. Thus FIG. 14a and FIG. 14b correspond to FIG. 9a and FIG. 9b, i.e. the former diagrams illustrate the case of uneven voltages of TxA and RxA and of TxB and RxB respectively on the bus 3; the latter illustrate the bus differential voltages of characters coded according to the second coding rule. FIG. 14c shows timing pulse edges detected with the help of the detection unit 212. FIG. 14d shows the suppression of the edges in the bit center by means of windows, which correspond to a coding without an external short circuit on the bus. FIG. 14e shows the remaining edges. According to FIG. 14f, in order to recover the clock signal the signals are delayed by a character duration and summed. The clock signal can then be used to generate a sampling signal with which the signals RxA and RxB can be sampled (FIG. 14g).

FIG. 15 shows a table according to which the sampled signals RxA and RxB are allocated by a logic, for example to the output value.

The object of this invention, which is based on the object described in DE 101 32 048, the contents of which have been expressly included here in full, is particularly suitable for use in passenger protection technology, as a means of facilitating the high-speed transmission of sensor data from various types of sensor satellites arranged in a motor vehicle, and advantageously guaranteeing the transmission of data to an evaluation unit located, for example, in the central part of the vehicle, even if the bus line 31, 32 in the CAN transmission channel 3 is short-circuited as a result of an accident, for example, i.e. if the BUS_L line 32 or the BUS_H line 31 is connected to GND or Vbat.

I claim:

1. An output unit for outputting a signal to a transmission channel having a first bus line and a second bus line of a motor vehicle, the output unit comprising:
   a fault-tolerant coding unit for receiving and converting a sensor signal into outgoing transmission signals TxA and TxB;
   at least two high-speed driver modules connected antiparallel to one another and downstream from said coding unit for connecting the output unit to the transmission channel and for converting the outgoing transmission signals TxA and TxB into the signal to be emitted; and
   a comparison unit performing a voltage comparison of the outgoing transmission signals TxA and TxB with incoming receive signals RxA and RxB, said comparison unit connected to said coding unit;
   said coding unit operating under and programmed with a first coding rule for a normal operating mode if equivalence between voltages of TxA and RxA and/or of TxB and RxB is detected by said comparison unit;
   said coding unit operating under and programmed with a second coding rule for a special operating mode in an event of inequivalence being detected by said comparison unit between the voltages of TxA and RxA and/or of TxB and RxB, and therefore in an event of one of the bus lines being externally short-circuited to ground or to a vehicle battery;
   the first and second coding rules for the outgoing transmission signals TxA and TxB provide a first character set of at least n+1 characters if a second character set for the sensor signal has n characters.

2. The output unit according to claim 1, wherein each of the characters of both the first and second character sets is represented by a discrete, electrical signal state, and, in an event of an external short circuit being detected in the transmission channel, a voltage of a low or high logic character about to be transmitted as a respective one of said outgoing transmission signals can be changed.

3. The output unit according to claim 1, wherein the second character set for the sensor signal has at least two different characters and the first character set for the outgoing transmission signals TxA, TxB, the incoming receive signals RxA and RxB, and the signal to be emitted, has at least three different characters.

4. The output unit according to claim 1, wherein an external short circuit in the transmission channel is detected at a latest after half of a signal time unit has elapsed.

5. The output unit according to claim 1, wherein a detection of an external short circuit causes the characters of the first character set having a logic low or a logic high to be changed such that a character of the first character set about to be transmitted can be switched to a different polarity at a point between 30% and 70% of a signal time unit has elapsed.

6. The output unit according to claim 1, wherein the second coding rule is formed such that:
   in an event of an external short-circuiting of the second bus line to the ground, a low logic character about to be transmitted in the transmission signal is converted into a high logic character with time condition;
   in the event of the external short-circuiting of the second bus line to the vehicle battery, a high logic character about to be transmitted in the transmission signal is converted into a low logic character with time condition;
   in the event of the external short-circuiting of the first bus line to the ground, a high logic character about to be transmitted in the transmission signal is converted into a low logic character with time condition;
   in the event of the external short-circuiting of the first bus line to the vehicle battery, a low logic character about to be transmitted in the transmission signal is converted into a high logic character with time condition; and
   a recessive ZERO character is transmitted as a ZERO character in each of the aforementioned short-circuit cases.

7. The output unit according to claim 1, wherein at least the first coding rule provides, for a signal time unit of the sensor signal that is occupied with a character, a signal time unit with a same duration in the transmission signal, the receive signal, and the signal to be emitted.

8. The output unit according to claim 1, wherein the first and second coding rules provide different characters for two consecutive signal time units in the transmission signal.

9. The output unit according to claim 1, wherein the first coding rule is formed such that:
   a "0" character in the sensor signal is always coded as a low logic character or a high logic character in the transmission signal;
   a "1" character in the sensor signal is always coded as a high logic character or a low logic character in the transmission signal;
   a "0" character following another "0" character in the sensor signal is coded as a ZERO character in the transmission signal, unless a preceding character in the transmission signal was already a ZERO character;
   a "1" character following another "$\mu$l" character in the sensor signal is coded as a ZERO character in the transmission signal, unless a preceding character in the transmission signal was already a ZERO character; and
   coding is effected according to basic coding rules if a preceding character in the transmission signal was a ZERO character.

10. The output unit according to claim 1, wherein the second character set for the sensor signal has at least two different characters and the first character set for the outgoing transmission signals TxA, TxB, the incoming receive signals RxA and RxB, and the signal to be emitted, has at least four different characters.

11. The output unit according to claim 1, wherein the second character set for the sensor signal has at least two different characters and the first character set for the outgoing transmission signals TxA, TxB, the incoming receive signals RxA and RxB, and the signal to be emitted, has five different characters.

12. The output unit according to claim 1, wherein an external short circuit in the transmission channel is detected at a latest after 40% of a signal time unit has elapsed.

13. The output unit according to claim 1, wherein an external short circuit in the transmission channel is detected at a latest after 30% f of a signal time unit has elapsed.

14. The output unit according to claim 1, wherein a detection of an external short circuit causes the characters of the first character set having a logic low or a logic high to be changed such that a character of the first character set about to be transmitted can be switched to a different polarity at a point between 40% and 60% of a signal time unit has elapsed.

15. The output unit according to claim 1, wherein a detection of an external short circuit causes the characters of the first character set having a logic low or a logic high to be changed such that a character of the first character set about to be transmitted can be switched to a different polarity at a point after 50% of the signal time unit has elapsed.

16. A receiving unit for receiving a signal to be received from a transmission channel having a first bus line and a second bus line of a motor vehicle, the receiving unit comprising:
- a decoding unit for converting incoming receive signals into an operating signal;
- at least two high-speed driver modules connected antiparallel to one another and upstream from said decoding unit, said driver modules connecting said receiver unit to the transmission channel and converting the signal to be received into the incoming receive signals;
- a detection unit permitting detection of timing pulse edges of the incoming receive signals, said detection unit connected to said decoding unit;
- said decoding unit operating under and programmed with a first decoding rule for a normal operating mode when synchronism of the timing pulse edges is detected by said detection unit for a signal time unit;
- said decoding unit operating under and programmed with a second decoding rule for a special operating mode when asynchronism of the timing pulse edges is detected by said detection unit for the signal time unit; and
- the first and second decoding rules for the operating signal provide a first character set of n characters if a second character set for the incoming receive signals have at least n+1 characters.

17. The receiver unit according to claim 16, wherein each of the characters of the first and second character sets is represented by a discrete, electrical signal state.

18. The receiver unit according to claim 16, wherein the first character set for the operating signal has at least two different characters and the second character set for the incoming receive signals and the signal to be received has at least three different characters.

19. The receiver unit according to claim 16, wherein the first character set for the operating signal has at least two different characters and the second character set for the incoming receive signals and the signal to be received has at least four different characters.

20. The receiver unit according to claim 16, wherein the first character set for the operating signal has at least two different characters and the second character set for the incoming receive signals and the signal to be received has five different characters.

21. The receiver unit according to claim 16, wherein if a time between two occurring timing pulse edges is less than 0.6 to 0.9 of the signal time unit or is greater than 1.1 times to 1.4 times the signal time unit, a character about to be decoded is interpreted as under a condition of an external short circuit.

22. The receiver unit according to claim 16, wherein if a time between two occurring timing pulse edges is less than 0.75 of the signal time unit or is greater than 1.25 times the signal time unit, a character about to be decoded is interpreted as under a condition of an external short circuit.

23. The receiver unit according to claim 16, wherein the second decoding rule is formed such that:
- in an event of an external short-circuiting of the second bus line to ground, a converted high logic character with time condition is decoded into a low logic character;
- in the event of the external short-circuiting of the second bus line to a vehicle battery, a converted low logic character with time condition is decoded into a high logic character;
- in the event of the external short-circuiting of the first bus line to the ground, a converted low logic character with time condition is decoded into a high logic character;
- in the event of the external short-circuiting of the first bus line to the vehicle battery, a converted high logic character with time condition is decoded into a low logic character; and
- a recessive ZERO character is decoded as a ZERO character in each of the aforementioned short-circuit cases.

24. The receiver unit according to claim 16, wherein at least the first decoding rule provides, for the signal time unit of the incoming receive signals and of the signal to be received, a signal time unit with a same duration as the operating signal.

25. The receiver unit according to claim 16, wherein the first decoding rule is formed such that:
- a low logic character in the incoming receive signals is always decoded into a "0" character or a "1" character in the operating signal;
- a high logic character in the incoming receive signals is always decoded into a "1" character or a "0" character in the operating signal; and
- the character in the operating signal, that is recovered from a ZERO character in the incoming receive signals, is identical to the preceding character of the operating signal.

26. The receiver unit according to claim 16, further comprising a unit for recovering a clock signal from the incoming receive signals, said unit for recovering the clock signal connected to said decoding unit.

27. A system for transmitting data in a motor vehicle via a transmission channel having at least two bus lines, the system comprising:
- an output unit containing:
    - a fault-tolerant coding unit for receiving and converting a sensor signal into outgoing transmission signals TxA and TxB;
    - at least two high-speed driver modules connected antiparallel to one another and downstream from said coding unit for connecting the output unit to the transmission channel and for converting the outgoing transmission signals TxA and TxB into the signal to be emitted;
    - a comparison unit performing a voltage comparison of the outgoing transmission signals TxA and TxB with incoming receive signals RxA and RxB, said comparison unit connected to said coding unit;
    - said coding unit operating under and programmed with a first coding rule for a normal operating mode if equivalence between voltages of TxA and RxA and/or of TxB and RxB is detected by said comparison unit;
    - said coding unit operating under and programmed with a second coding rule for a special operating mode in an event of inequivalence being detected by said comparison unit between the voltages of TxA and RxA and/or of TxB and RxB, and therefore in an event of one of the bus lines being externally short-circuited to ground or to a vehicle battery;

the first and second coding rules for the outgoing transmission signals TxA and TxB provide a first character set of at least n+1 characters if a second character set for the sensor signal has n characters; and a receiver unit containing:

a decoding unit for converting the incoming receive signals RxA and RxB into an operating signal;

said driver modules connecting said receiver unit to the transmission channel and converting the signal to be received into the incoming receive signals RxA and RxB;

a detection unit permitting detection of timing pulse edges from the incoming receive signals RxA and RxB, said detection unit connected to said decoding unit;

said decoding unit operating under and programmed with the first decoding rule for the normal operating mode when synchronism of the timing pulse edges is detected by said detection unit for a signal time unit;

said decoding unit operating under and programmed with the second decoding rule for the special operating mode when asynchronism of the timing pulse edges is detected by said detection unit for the signal time unit;

the first and second decoding rules for the operating signal provide the second character set of n characters if the first character set for the incoming receive signals RxA and RxB have at least n+1 characters.

28. A method for transmitting data in a motor vehicle, which comprises the steps of:

coding a sensor signal using the output unit according to claim 1 into a signal to be transmitted; and transmitting the signal to be transmitted to a receiver unit resulting in a received signal.

29. The method according to claim 19, which further comprises decoding the received signal into an operating signal by the receiver unit according to claim 16.

* * * * *

UNITED STATES PATENT AND TRADEMARK OFFICE
CERTIFICATE OF CORRECTION

PATENT NO. : 7,016,770 B2
DATED : March 21, 2006
INVENTOR(S) : Bernd Pfaffeneder It is certified that error appears in the above-identified patent and that said Letters Patent is hereby corrected as shown below:

<u>Title page,</u>
Item [86], should read as follows:
-- PCT No.: PCT/EP03/010577 --.

Signed and Sealed this

Twenty-third Day of May, 2006

JON W. DUDAS
*Director of the United States Patent and Trademark Office*